United States Patent Office 3,488,346
Patented Jan. 6, 1970

3,488,346
17-ALPHA-SUBSTITUTED-6-ALPHA-METHYL-PREGN-4-EN COMPOUNDS
Ralph I. Dorfman, Shrewsbury, Marcel Gut and Miasnig Hagopian, Worcester, and Bjarte Löken, Shrewsbury, Mass., assignors, by mesne assignments, to Julius Schmid Inc., New York, N.Y., a corporation of New York
No Drawing. Continuation-in-part of applications Ser. No. 189,288, Apr. 23, 1962, and Ser. No. 343,151, Feb. 6, 1964. This application June 15, 1964, Ser. No. 375,327
Int. Cl. C07c 169/36, 169/34; A61k 27/00
U.S. Cl. 260—239.55                       4 Claims This application is a continuation-in-part of application Ser. No. 189,288 filed Apr. 23, 1962, now U.S. Patent No. 3,137,689 and also a continuation-in-part of application Ser. No. 343,151 filed Feb. 6, 1964, now U.S. Patent No. 3,352,890.

This invention relates to improved 6-alpha-methyl-pregn-4-en compounds having the formula

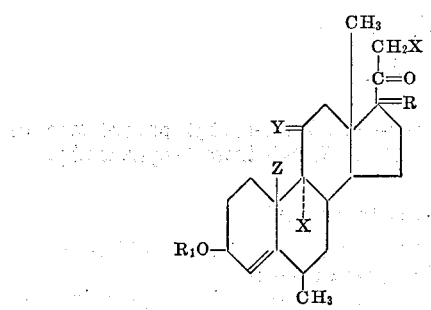

wherein R is hydrogen, hydroxy or acyloxy; $R_1$ is hydrogen or acyl, the acyl group of R or $R_1$ being a carboxylic acid acyl group having from 1 to 10 carbon atoms; X is hydrogen, chlorine or fluorine; Y is =O, $$\begin{array}{c} H \\ | \\ -OH \end{array}$$

or $H_2$; and Z is hydrogen or methyl; and 20-ketals thereof; and to a method of selectively reducing the 3-oxo group of a 3,20-dioxo-pregn-4-en compound to reduce the 3-keto to 3-hydroxy, selective to effect that reduction without further reduction of the 20-oxo group and other sensitive groups that may be present in the steroid molecule such as 11-oxo or 17 acyloxy, and without need for ketal blocking groups at least in the sensitive 20 position.

Our compounds have outstanding inhibitory activity in living bodies. Our modified progesterone compounds of this formula are strongly anti-fertility, anti-estrogenic and anti-androgenic. Our compounds of this formula which have oxo or hydroxy substitution in the 11 position are further anti-implantation.

The reduction of progesterone derivatives, as heretofore practiced in the art, usually required the protection of at least the 20-keto group, such as by forming a 20-ketal thereof, and ultimately hydrolyzing that ketal under the mildest conditions and with great danger of elimination of the allylic alcohol function to form a diene. Gut, J. Org. Chem., 21, 1327–1328 (1956). Moreover, while it has been proposed to reduce progesterone in polar solvent such as isopropanol without protection of the 20-oxo group (D. Kepfer—Tetrahedron, 15, 193 (1961)) a complex mixture of reduction products including substantial 20-oxo reduction was always obtained, necessitating laborious and non-commercial digitenide separation of the 3-beta-hydroxy derivative before chromatography. It has been found, surprisingly, according to the present invention, that 6-alpha-methyl-17-alpha-substituted progesterone, and such 3-oxo derivatives of compounds identified in the generic formula stated above can be selectively reduced without need for oxo, particularly 20-oxo, blocking groups where the parent 6-alpha-methyl-17-alpha-substituted progesterone compound is reduced with an alkali metal borohydride in the presence of a substantially non-polar solvent such as a lower hydrocarbon ether, typically a lower alkyl and cyclo alkyl ether having from 2 to 7 carbon atoms, together with a small quantity, usually about 1% water based on the quantity of solvent.

In a preferred reaction, the 17-acyloxy derivative of 6-alpha-methyl progesterone is used in carrying out the reduction with sodium borohydride, the reducing agent being added to the 6-alpha-methyl-17-alpha-acyloxy progesterone compound in quantity substantially only sufficient to effect the 3-oxo reduction, preferably in lower hydrocarbon ether usually having from 2 to 7 carbon atoms, both cyclic, such as tetrahydrofurane, dioxane, 1,3-dioxolane, 2,3-dimethyl-1,3-dioxolane, 2-methyl-2-ethyl-1,3-dioxolane, furan and acyclic, such as lower alkyl ethers like diethyl ether or methyl-ethyl ether methylisopropyl ether, dimethyl ether, dimethyl acetal, diethoxy ethylene, glycol dimethyl ether, methyl tertiary butyl ether, diisopropyl ether, dibutyl ether and the like. Such solvents are outstanding in this highly selective reduction because fewer side reaction products result and a substantially pure product may be separated by crystallization and filtration.

In effecting the reaction, an excess of reducing agent is generally avoided to avoid possible contamination with other reduction products in this reaction. The reduction is effected largely by ambient temperature contact of the starting compound with the sodium borohydride in the lower hydrocarbon ether solvent in the presence of a trace of water. For instance, the reducing agent is added to the substituted progesterone compound at ambient temperatures in the presence of the solvent for an indefinite period of several minutes up to 100 hours. Thereafter the inorganic oxidation and hydrolysis products are removed by filtration, the clear filtrate evaporated to dryness and the residue crystallized from an appropriate solvent, to give a relatively pure allylic alcohol reduction product made available in commercial quantities in a much simplified procedure.

Various useful derivatives of the 3-hydroxy compound can be formed by common chemical procedures. For instance, the 17-alpha-acyloxy group can be hydrolyzed with methanolic alkali to form a 17-hydroxy compound thereof and/or the 3-hydroxy group can be acylated with a carboxylic acid acyl having from 1 to 10 carbon atoms either by treating the 3-hydroxy reduction product with the anhydride of the desired carboxylic acid or it may be esterified using the appropriate carboxylic acid anhydride in pyridine solution of the allylic alcohol compound.

The carboxylic acid anhydride may be acetic, acrylic, propionic, butyric, dimethyl valeric, caproic, heptanoic, octanoic, cyclopentanoic, cyclohexanoic, phenyl acetic, and the like.

Where the compound desirably carriers other substituents as identified in the generic formula above, the starting material usually will have such substituents; for instance, 11-oxo or hydroxy, 9 or 21 chloro or fluoro as pre-selected before applying the selective reduction hereof.

The reaction is indicated diagrammatically according to the following scheme:

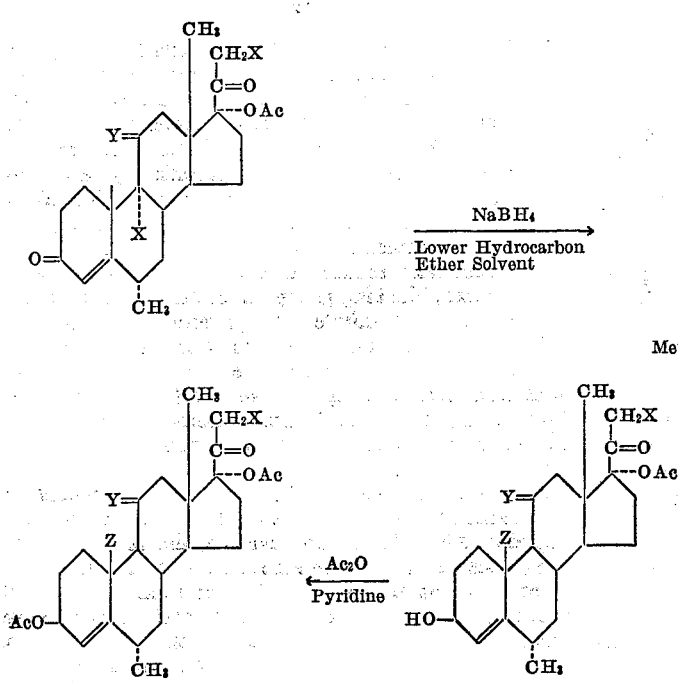
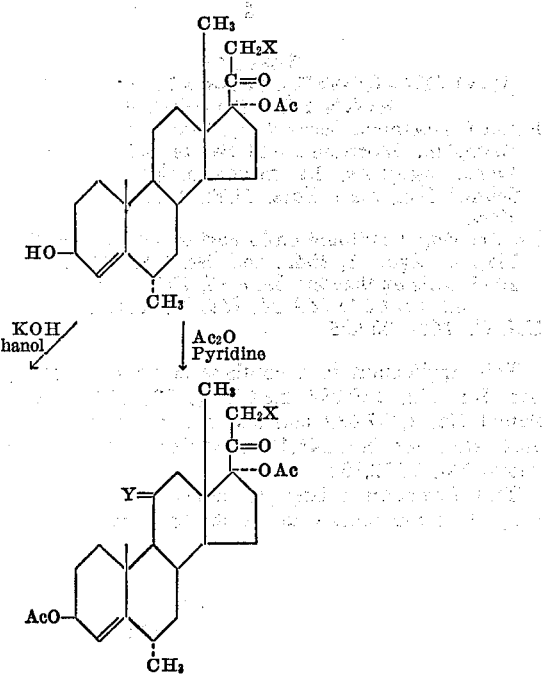

wherein X, Y and Z have the significance as identified above and Ac is 1–10 carbon atom acyl, preferably acetyl.

The following examples illustrate the practice of this invention:

EXAMPLE I

To 20 parts of 17-alpha-acetoxy-6-alpha-methylprogesterone were added 1000 parts of dry peroxide free tetrahydrofuran and 2 parts of finely ground sodium borohydride. The mixture was left stirring at room temperature for a period of 15 minutes, and then 10 parts of water were added. The stirring at room temperature was maintained for 3 days. At that time a flocculent white precipitate had separated—part of it in suspension and part of it adhering to the sides of the flask as a slime. This precipitate was found to consist of the inorganic oxidation and hydrolysis products of the sodium borohydride, and was efficiently removed by filtration. The perfectly clear filtrate was evaporated at reduced pressure, and at a bath temperature of 25° C. To the residue was added 50 parts ether and a heavy crystalline precipitate formed by standing over night. This material was filtered, washed with ether and dried. 7.1 parts obtained as a first crop harvest. The mother liquors were allowed to stand, during slow evaporation an addition crop of 5.8 parts was obtained. These crops constituted a yield of 64.5% of 3-beta-hydroxy-17-alpha-acetoxy - 6 - alpha-methylpregn-4-en-20-one. The analytical sample was obtained by Soxhlet extraction of the combined crudes with ether and this material showed a melting point of about 178–181° C., and a specific optical rotation of about +22° when measured in chloroform solution at +22° about 1 g./100 ml. concentration. The infrared spectrum in potassium bromide suspension showed the salient $\lambda_{max}$ seriatim: 2.85 (OH), 5.80 (C=O, acetate), 5.91 (C=O), 6.09 (C=C), 8.00 (acetate band).

Proceeding according to this example but substituting for the 17-alpha-acetoxy-6-alpha-methyl progesterone as starting material, 17-alpha-acetoxy-11-oxo-21-chloro-6-alpha-methyl progesterone, or
17-alpha-acetoxy-11-hydroxy-9-chloro-6-alpha-methyl-progesterone or
17-alpha-acetoxy-9-fluoro-6-alpha-methyl progesterone or
17-alpha-acetoxy-11-oxo-21-fluoro-6-alpha-methyl progesterone or
17-alpha-acetoxy-19-nor-6-alpha-methyl progesterone or
17-alpha-acetoxy-11-oxo-9,21-dichloro-6-alpha-methyl progesterone, there was respectively obtained 3-beta-hydroxy-17-alpha-acetoxy-11-oxo-21-chloro-6-alpha-methyl-pregn-4-en-20-one,
3-beta-hydroxy-17-alpha-acetoxy-11-hydroxy-9-chloro-6-alpha-methyl-pregn-4-en-20-one,
3-beta-hydroxy-17-alpha-acetoxy-9-fluoro-6-alpha-methyl-pregn-4-en-20-one,
3-beta-hydroxy-17-alpha-acetoxy-11-oxo-21-fluoro-6-alpha-methyl-pregn-4-en-20-one,
3-beta-hydroxy-17-alpha-acetoxy-19-nor-6-alpha-methyl-pregn-4-en-20-one and
3-beta-hydroxy-17-alpha-acetoxy - 11-oxo-9,21-dichloro-6-alpha-methyl-pregn-4-en-20-one.

EXAMPLE II

The mother liquors from Example I were combined and concentrated to dryness under reduced pressure. To the residue was added a little dry pyridine, and the concentration to dryness repeated. This efficiently removed the residual solvents. To this residue were added 14 parts of dry pyridine and 6.5 parts of acetic anhydride, and the mixture was left standing at room temperature for 36 hours. 1.5 parts of water were added to destroy excess acetic anhydride, and after the time elapse of about one hour a total of 100 parts of water and 50 parts of ice was added. The oil which separated soon solidified to an oily crystalline mass, which was separated. Trituration with a little methanol gave a crystalline slurry. The crystals were filtered and washed with a little methanol. 2.6 parts of 3-beta,17-alpha-diacetoxy-6-alpha - methylpregn-4-en-20-one were obtained, adding favorably to the yield of the selective reduction described in Example I. The analytical sample was prepared by recrystallization from aqueous methanol. The melting point of this purified material was about 153.5 to 155.5° C., and the specific optical rotation was about −8°, measured in chloroform solution, the most characteristic bands in infrared were (measured in potassium bromide suspension): 5.75 (C=O, acetate), 5.87 (C=O), 6.08 (C=C), 8.02 (acetate) microns.

Following the procedure of this example but substituting for the 3-beta-hydroxy-17-alpha-acetoxy-6-alpha-methyl-pregn-4-en-20-one as starting material, 3-beta-hydroxy-17-alpha-acetoxy-11-oxo-21-chloro-6-alpha-methyl-pregn-4-en-20-one or
3-beta-hydroxy-17-alpha-acetoxy-11-hydroxy-9 - chloro-6-alpha-methyl-pregn-4-en-20-one or
3-beta-hydroxy-17-alpha-acetoxy-9-fluoro-6-alpha-methyl-pregn-4-en-20-one,
3-beta-hydroxy-17-alpha-acetoxy-11-oxo-21-fluoro-6-alpha-methyl-pregn-4-en-20-one or
3-beta-hydroxy-17-alpha-acetoxy-19-nor-6-alpha-methyl pregn-4-en-20-one or
3-beta-hydroxy-17-alpha-acetoxy-11-oxo-9,21 - dichloro-6-alpha-methyl-pregn-4-en-20-one, there was respectively obtained 3-beta-17-alpha-di-acetoxy-11-oxo-21- chloro-6-alpha-methyl-pregn-4-en-20-one,
3-beta-17-alpha-di-acetoxy-11-hydroxy-9-chloro-6-alpha-methyl-pregn-4-en-20-one,
3-beta-17-alpha-di-acetoxy-9-fluoro-6-alpha-methyl-pregn-4-en-20-one,
3-beta-17-alpha-di-acetoxy-11-oxo-21-fluoro-6-alpha-methyl-pregn-4-en-20-one,
3-beta-17-alpha-di-acetoxy-19-nor-6-alpha-methyl-pregn-4-en-20-one and
3-beta-17-alpha-di-acetoxy-11-oxo-9,21-dichloro-6-alpha-methyl-pregn-4-en-20-one.

EXAMPLE III

A mixture of 0.3 part of 3-beta-hydroxy-17-alpha-acetoxy-6-alpha-methylpregn-4-en-20-one (Example I), 1.0 part of pyridine and 0.5 part or acetic anhydride was left for 36 hours at room temperature. A few drops of water (0.1 part) was added and room temperature conditions maintained for a period of 1 hour. More water (3 parts) was then added, and the mixture left in the refrigerator for a couple of hours to complete the crystallization. The crystals were filtered, washed with water and dried. 0.322 part was obtained corresponding to 97% of theory, M.P. about 151 to 152° C. Recrystallization from ether-pentane provided the analytical sample of the 3-beta-17-alpha-diacetoxy-6-alpha - methylpregn-4-en-20-one in all respects identical with the substance obtained in Example II.

EXAMPLE IV

In the case that the 3-beta-17-alpha-diacetoxy-6-alpha-methylpregn-4-en-20-one is the desired product and not the 17-monoacetate, the tetrahydrofuran residue from Example I, can be distilled with pyridine to remove residual solvent and then acetylated directly according to the procedure of Example II, thus obviating the isolation of the 17-monoacetate in a crystalline form. 3-beta-17-alpha-diacetoxy-6-alpha-methylpregn-4-en-20 - one is obtained, with savings in time and overall performance yieldwise, as the 3,17-diacetate is easier to obtain in a crystalline form than the 17-monoacetate.

Similar compounds can be formed following the same procedure as set forth in Examples III or IV.

EXAMPLE V

To a refluxing solution of 0.5 part of 3-beta-hydroxy-17-alpha-acetoxy-6-alpha-methylpregn-4 - en - 20 - one in methanol (10 parts), was added slowly during 30 minutes 1.3 parts of a N/1 aqueous sodium hydroxide solution. The mixture was refluxed for a period of 60 minutes subsequent to the completion of the addition. Distilled water (7 parts) was added and the crystallization was initiated by slow cooling, and completed over night in the refrigerator. The crystals were filtered and washed well with water. Yield—0.4715 part of 3-beta-17-alpha-dihydroxy-6-alpha-methyl-pregn-4-en-20-one, melting at about 200 to 203° C. Recrystallization from methanol provided the analytical sample exhibiting a melting point of about 201 to 203° C., and an optical rotation of about +32° measured in chloroform solution. The most characteristic bands in infrared were: (KBr suspension): 2.9 (—OH), 5.92 (C=O), 6.07 (C=C), microns.

Proceeding according to this example but substituting for the 3-beta-hydroxy-17-alpha-acetoxy-6-alpha-methyl-pregn-4-en-20-one as starting material.

3-beta-hydroxy-17-alpha-acetoxy-11-oxo-21-chloro-6-alpha-methyl-pregn-4-en-20-one, or
3-beta-hydroxy-17-alpha-acetoxy-11-hydroxy-9-chloro-6-alpha-methyl-pregn-4-en-20-one or
3-beta-hydroxy-17-alpha-acetoxy-9-fluoro-6-alpha-methyl-pregn-4-en-20-one or
3-beta-hydroxy-17-alpha-acetoxy-11-oxo-21-fluoro-6-alpha-methyl-pregn-4-en-20-one, or
3-beta-hydroxy-17-alpha-acetoxy-19-nor-6-alpha-methyl-pregn-4-en-20-one or
3-beta-hydroxy-17-alpha-acetoxy-11-oxo-9,21-dichloro-6-alpha-methyl-pregn-4-en-20-one there was respectively obtained 3-beta-17-alpha-dihydroxy-11-oxo-21-chloro-6-alpha-methyl-pregn-4-en-20-one,
3-beta-17-alpha-dihydroxy-11-hydroxy-9-chloro-6-alpha-methyl-pregn-4-en-20-one,
3-beta-17-alpha-dihydroxy-9-fluoro-6-alpha-methyl-pregn-4-en-20-one,
3-beta-17-alpha-dihydroxy-11-oxo-21-fluoro-6-alpha-methyl-pregn-4-en-20-one,
3-beta-17-alpha-dihydroxy-19-nor-6-alpha-methyl-pregn-4-en-20-one and
3-beta-17-alpha-dihydroxy-11-oxo-9,21-dichloro-6-alpha-methyl-pregn-4-en-20-one.

EXAMPLE VI

A mixture of 3-beta-17-alpha-dihydroxy-6-alpha-methylpregn-4-en-20-one (0.2 part), pyridine (0.7 part, dry), and acetic anhydride (0.35 part) was left for 36 hours at room temperature. 0.1 part of water was added and room temperature conditions maintained for a period of one hour by which time the excess anhydride was assumed hydrolyzed. More water was added, and the monoacetate was separated as an oil, which solidified and was recrystallized twice from aqueous methanol. This sample of 17-alpha-hydroxy-3-beta-acetoxy-6-alpha-methylpregn-4 - en-20-one melted at about 232 to 235°. The characteristic infrared bands obtained in KBr suspension were: 2.80 (OH), 5.80, 5.85 (C=O, acetate and C=O superimposed), 6.02 (inflection, C=C), 7.9–8.00 (acetate) was about +7.5°.

Proceeding according to this example but substituting for the 3-beta-17-alpha-dihydroxy-6-alpha-methyl-pregn-4-en-20-one as starting material.

3-beta,17-alpha-dihydroxy-11-oxo-21-chloro-6-alpha-methyl-pregn-4-en-20-one or
3-beta,17-alpha-11-beta-trihydroxy-9-chloro-6-alpha-methyl-pregn-4-en-20-one or
3-beta,17-alpha-dihydroxy-9-fluoro-6-alpha-methyl-pregn-4-en-20-one or
3-beta,17-alpha-dihydroxy-11-oxo-21-fluoro-6-alpha-methyl-pregn-4-en-20-one there was respectively obtained 3-beta-acetoxy-17-alpha-hydroxy-11-oxo-21-chloro-6-alpha-methyl-pregn-4-en-20-one,
3-beta-acetoxy-17-alpha-hydroxy-11-hydroxy-9-chloro-6-alpha-methyl-pregn-4-en-20-one,
3-beta-acetoxy-17-alpha-hydroxy-9-fluoro-6-alpha-methyl-pregn-4-en-20-one,
3-beta-acetoxy-17-alpha-hydroxy-11-oxo-21-fluoro-6-alpha-methyl-pregn-4-en-20-one,
3-beta-acetoxy-17-alpha-hydroxy-19-nor-6-alpha-methyl-pregn-4-en-20-one, and 3-beta-acetoxy-17-alpha-hydroxy-11-oxo-9,21-dichloro-6-alpha-methyl-pregn-4-en-20-one.

EXAMPLE VII

To 17-alpha - acetoxy - 6 - alpha - methyl progesterone (11.5 g.) was added 1000 cc. of 2-methyl-2-ethyl-1,3-dioxolane and sodium borohydride (780 mg.) The mixture was left stirring at room temperature for 2 hours and 10 cc. of water was added and the stirring continued for 65 hours, forming a white precipitate of inorganic residues. The product was filtered through a coarse filter and concentrated almost to dryness under reduced pressure. 50 cc. os ether was added and the steroid was filtered washed well with water and the granular precipitate left standing over night in the laboratory. The product was filtered, washed with ether and dried. 9.8 grams of the product obtained was the same as in Example I.

Proceeding according to this example but substituting for the 17-alpha-acetoxy-6-alpha-methyl progesterone as starting material, 17-alpha-acetoxy-21-chloro-6-alpha-methyl - progesterone or
17-alpha-propionoxy-11-oxo-6-alpha-methyl-progesterone, or
17-alpha-acetoxy-11-hydroxy-6-alphamethyl-progesterone or
17-alpha-acetoxy-11-oxo-9-fluoro-6-alpha-methyl-progesterone or
17-alpha-acetoxy-11-oxo-9,21-dichloro-6-alpha-methyl-progesterone or
17-alpha-acetoxy-11-oxo-19-nor-6-alpha-methyl-progesterone or
17-alpha-acetoxy-11-oxo-9,21-difluoro-6-alpha-methyl-progesterone or
17-alpha-acetoxy-19-nor-6-alpha-methyl-progesterone there was respectively obtained 3-beta-hydroxy-17-alpha-acetoxy-21-chloro-6-alpha-methyl-pregn-4-en-20-one,
3-beta-hydroxy-17-alpha-propionoxy-11-oxo-6-alpha-methyl-pregn-4-en-20-one
3-beta-hydroxy-17-alpha-acetoxy-11-hydroxy-6-alpha-methyl-pregn-4-en-20-one,
3-beta-hydroxy-17-alpha-acetoxy-11-oxo-9-fluoro-6-alpha-methyl-pregn-4-en-20-one,
3-beta-hydroxy-17-alpha-acetoxy-11-oxo-9,21-dichloro-6-alpha-methyl-pregn-4-en-20-one,
3-beta-hydroxy-17-alpha-acetoxy-11-oxo-19-nor-6-alpha-methyl-pregn-4-en-20-one,
3-beta-hydroxy-17-alpha-acetoxy-11-oxo-9,21-difluoro-6-alpha-methyl-pregn-4-en-one and
3-beta-hydroxy-17-alpha-acetoxy-9-nor-6-alpha-methyl-pregn-4-en-20-one.

EXAMPLE VIII

Proceeding according to Example III but substituting for the acetic anhydride, propionic anhydride, butyric anhydride, dimethyl valeric anhydride, caproic anhydride, heptanoic anhydride, oxtanoic anhydride, cyclopentanoic anhydride, cyclohexanoic anhydride, phenylacetic anhydride there was respectively obtained.

3-beta-propionoxy-17-acetoxy-6-alpha-methyl-pregn-4-en-20-one,
3-beta-butyroxy-17-acetoxy-6-alpha-methyl-pregn-4-en-20-one,
3-beta-dimethyl-valeroxy-17-acetoxy-6-alpha-methyl-pregn-4-en-20-one,
3-beta-caproyloxy-17-acetoxy-6-alpha-methyl-pregn-4-en-20-one,
3-beta-heptanoyloxy-17-acetoxy-6-alpha-methyl-pregn-4-en-20-one,
3-beta-octanoyloxy-17-acetoxy-6-alpha-methyl-pregn-4-en-20-one,
3-beta-cyclopentanoyloxy-17-acetoxy-6-alpha-methyl-pregn-4-en-20-one,
3-beta-cyclohexanoyloxy-17-acetoxy-6-alpha-methyl-pregn-4-en-20-one and
3-beta-phenylacetoxy-17-acetoxy-6-alpha-methyl-pregn-4-en-20-one.

Proceeding according to Example III but substituting for the 3 - beta-hydroxy-17-alpha-acetoxy-6-alpha-methyl-preg-4-en-20-one as starting material, 3-beta-hydroxy-17-alpha-acetoxy-21-chloro-6-alpha-methyl-pregn-4-en-20-one or
3-beta-hydroxy-17-alpha-propionoxy-11-oxo-6-alpha-methyl-pregn-4-en-20-one or
3-beta-hydroxy-17-alpha-acetoxy-11-oxo-hydroxy-6-alpha-methyl-pregn-4-en-20-one or
3-beta-hydroxy-17-alpha-acetoxy-11-oxo-9-fluoro-6-alpha-methyl-pregn-4-en-20-one or
3-beta-hydroxy-17-alpha-acetoxy-11-oxo-9,21-dichloro-6-alpha-methyl-pregn-4-en-20-one or
3-beta-hydroxy-17-alpha-acetoxy-11-oxo-19-nor-6-alpha-methyl-pregn-4-en-20-one or
3-beta-hydroxy-17-alpha-acetoxy-11-oxo-9,21-difluoro-6-alpha-methyl-pregn-4-en-20-one or
3-beta-hydroxy-17-alpha-acetoxy-19-nor-6-alpha-methyl-pregn-4-en-20-one, there was respectively obtained, 3-beta-17-alpha-diacetoxy-21-chloro-6-alpha-methyl-pregn-4-en-20-one,
3-beta-acetoxy-17-alpha-propionoxy-11-oxo-6-alpha-methyl-pregn-4-en-20-one,
3-beta-17-alpha-diacetoxy-11-beta-hydroxy-6-alpha-methyl-pregn-4-en-20-one,
3-beta-17-alpha-diacetoxy-11-oxo-9-fluoro-6-alpha-methyl-pregn-4-en-20-one,
3-beta-17-alpha-diacetoxy-11-oxo-9,21-dichloro-6-alpha-methyl-pregn-4-en-20-one,
3-beta-17-alpha-diacetoxy-11-oxo-19-nor-6-alpha-methyl-pregn-4-en-20-one,
3-beta-17-alpha-diacetoxy-11-oxo-9,21-difluoro-6-alpha-methyl-pregn-4-en-20-one and
3-beta-17-alpha-diacetoxy-19-nor-6-alpha-methyl-pregn-4-en-20-one.

EXAMPLE IX

Proceeding according to Example V but substituting for the 3 - beta - hydroxy-17-alpha-acetoxy-6-alpha-methyl-pregn-4-en-20-one as starting material 3-beta-hydroxy-17-alpha-acetoxy-21-chloro-6-alpha-methyl-pregn-4-en-20-one or
3-beta-hydroxy-17-alpha-propionoxy-11-oxo-6-alpha-methyl-pregn-4-en-20-one or
3-beta-hydroxy-17-alpha-acetoxy-11-oxo-6-alpha-methyl-pregn-4-en-20-one or
3-beta-hydroxy-17-alpha-acetoxy-11-hydroxy-9-fluoro-6-alpha-methyl-pregn-4-en-20-one or
3-beta-hydroxy-17-alpha-acetoxy-11-beta-hydroxy-9,21-dichloro-6-alpha-methyl-pregn-4-en-20-one or
3-beta-hydroxy-17-alpha-acetoxy-11-oxo-19-nor-6-alpha-methyl-pregn-4-en-20-one or
3-beta-hydroxy-17-alpha-acetoxy-11-oxo-9,21-difluoro-6-alpha-methyl-pregn-4-en-20-one or
3-beta-hydroxy-17-alpha-acetoxy-9-chloro-19-nor-6-alpha-methyl-pregn-4-en-20-one there was respectively obtained 3-beta-17-alpha-dihydroxy-21-chloro-6-alpha-methyl-pregn-4-en-20-one,
3-beta-17-alpha-dihydroxy-11-oxo-6-alpha-methyl-pregn-4-en-20-one,
3-beta-17-alpha-dihydroxy-11-oxo-6-alpha-methyl-pregn-4-en-20-one,
3-beta-17-alpha-11-beta-trihydroxy-9-fluoro-6-alpha-methyl-pregn-4-en-20-one,
3-beta-17-alpha-11-beta-trihydroxy-9,21-dichloro,-6-alpha-methyl-pregn-4-d-en-20-one, 3-beta-17-alpha-dihydroxy-11-oxo-19-nor-6-alpha-methyl-pregn-4-en-20-one,
3-beta-17-alpha-dihydroxy-11-oxo-9,21-difluoro-6-alpha-methyl-pregn-4-en-20-one and
3-beta-17-alpha-dihydroxy-9-chloro-19-nor-6-alpha-methyl-pregn-4-en-20-one.

EXAMPLE X

Proceeding according to Example VI but substituting for the 3 - beta - 17-alpha-dihydroxy-6-alpha-methyl-pregn-4-en-20-one as starting material, 3-beta-17-alpha-dihydroxy-21-chloro-6-alpha-methyl-pregn-4-en-20-one or
3-beta-17-alpha-dihydroxy-11-oxo-9-chloro-6-alpha-methyl-pregn-4-en-20-one or
3-beta-17-alpha-11-beta-trihydroxy-6-alpha-methyl-pregn-4-en-20-one or
3-beta-17-alpha-dihydroxy-11-oxo-9-fluoro-6-alpha-methyl-pregn-4-en-20-one or
3-beta-17-alpha-11-beta-trihydroxy-9,21-dichloro-6-alpha-methyl-pregn-4-en-20-one or
3-beta-17-alpha-dihydroxy-11-oxo-19-nor-6-alpha-methyl-pregn-4-en-20-one or
3-beta-17-alpha-dihydroxy-11-oxo-9,21-difluoro-6-alpha-methyl-pregn-4-en-20-one or
3-beta-17-alpha-dihydroxy-21-chloro-19-nor-6-alpha-methyl-pregn-4-en-20-one there was respectively obtained 3-beta-acetoxy-17-alpha-hydroxy-11-oxo-21-chloro-6-alpha-methyl-pregn-4-en-20-one,
3-beta-acetoxy-17-alpha-hydroxy-11-oxo-9-chloro-6-alpha-methyl-pregn-4-en-20-one,
3-beta-acetoxy-11-beta-17-dihydroxy-6-alpha-methyl-pregn-4-en-20-one,
3-beta-acetoxy-17-alpha-hydroxy-11-oxo-9-fluoro-6-alpha-methyl-pregn-4-en-20-one,
3-beta-acetoxy-17-alpha-11-beta-dihydroxy-9,21-dichloro-6-alpha-methyl-preg-4-en-20-one,
3-beta-acetoxy-17-alpha-hydroxy-11-oxo-19-nor-6-alpha-methyl-pregn-4-en-20-one,
3-beta-acetoxy-17-alpha-hydroxy-11-oxo-9,21-diflouro-6-alpha-methyl-pregn-4-en-20-one and
3-beta-acetoxy-17-alpha-hydroxy-21-chloro-19-nor-6-alpha-methyl-pregn-4-en-20-one.

It has been found possible to reduce 6-alpha-methyl-17-acyloxy progesterone compounds with alkali metal borohydride in the presence of tertiary butanol to which water can be added, and in which digitonide separation of the 3-beta-hydroxy reduction product is not necessary. However, it is found that considerably more attractive reduction results which tends to slightly reduce some of the 20-keto compounds resulting in undesirable impurity. Operating in this manner, the ultimate reduced compound can be produced with chromatographic purification and a procedure which is somewhat more expensive because of the extra step of purification than is available using ether as a solvent according to the earlier examples herein. However, with that drawback, tertiary butanol can be used as a solvent although the procedure is not preferred according to the following example:

EXAMPLE XI

3β-hydroxy-17α-acetoxy-6α-methylpregn-4-en-20-one

To 17 - alpha - acetoxy - 6 - alpha - methylprogesterone (11.5 g.) was added tertiary butanol (2 l. anhydrous) and sodium borohydride (780 mg.). The mixture was left stirring at room temperature for 62 hours, filtered through a coarse filter and concentrated almost to dryness under reduced pressure. 500 ml. of distilled water and ice was added and the mixture stirred for 2 hours. The steroid was filtered, washed well with water and the granular precipitate left for 8 days in the laboratory. This material was taken up in 200 ml. benzene, some insoluble decanted off (700 mg., 20-hydroxy derivative) and chromatographed on 600 g. silica gel. Elution with benzene chloroform of increasing chloroform content, pure chloroform and finally with chloroform containing 1% methanol, provided fractions, which after evaporation and crystallization from ether/hexane gave a total of 2.073 g. of 3-beta-hydroxy-17 - alpha - acetoxy - 6 - alpha - methylpregn - 4 - en - 20-one: M.P. 178–181°; $[\alpha]_D +25°$. $KBr_{max}$, 2.85 (OH), 5.80 (C=O, acetate), 5.91 (C=O), 6.10 (C=C), 8.00 (acetate).

Calculated for $C_{24}H_{36}O_4$: C, 74.19; H, 9.34. Found: C, 74.39; H, 9.56.

From the more polar fractions (40, 50 and 100% chloroform) a total of 5.57 g. of material was obtained which according to the infrared spectrum appeared to be essentially starting material containing the allylic alcohol. This material can be recycled.

Our compounds for the purposes intended may be used by admixing with various therapeutically acceptable carriers and excipient substances; for instance, fixed oil such as peanut oil, olive oil or the like or inert insoluble soaps such as aluminum stearate and implantation or injection as a depot type composition, or the product in the pure state or mixed with excipient such as starch, bentonite or the like may be compressed into tablets sized to a suitable dosage level or fraction or multiple thereof as indicated by the above tests.

The compounds of this invention, and in particular those represented by the formula in col. 1, line 26 wherein R is hydrogen, are also conveniently prepared by first forming the 20-lower alkylene ketal of 3-beta-hydroxy-6-methyl-pregn-5-en-20-one, or its 3-acyloxy derivative. 6-methylpregnenolone is readily available from 6-methyldiosgenin by known methods. 6-methylpregnenolone 20-ethylene ketal is also available from dehydro-epiandrosterone or its 3-acyloxy derivative via the intermediate 3-beta, 5-alpha-dihydroxy - 6 - beta - methylpregnan - 20 - one described by Miramontes and co-workers (J. Am. Chem. Soc., 82, 6155 (1960)). This compound, preferably as the 3-beta-acylated derivative gives, when subjected to the trans-ketalization conditions 2 - methyl - 2 - ethyl - 1,3 - dioxolane containing .2% p-toluenesulfonic acid, 6-methylpregnenolone 20-ethylene ketal or its 3-beta-acylate (Hyp. J. Dauben and co-workers, Am. Chem. Soc., 76, 1359 (1954)). During this ketalization procedure there occurs a simultaneous elimination of water from carbons 5 and 6. This is another important process feature of this invention, illustrated by the examples which follow below.

The 20-lower alkylene ketal derivative of 6-methylpregnenolone can be formed in excellent yield by heating with the appropriate glycol (ethylene or propylene glycol) in the presence of an acid catalyst such as p-toluenesulfonic acid. The water which is formed as a result of the condensation reaction is conveniently removed from the reaction mixture by azeotropic distillation with benzene.

If the 20-lower alkylene ketal derivative is an ethylene ketal, the same result is obtained using acid catalyzed transketalization described by Hyp. J. Dauben and co-workers, supra.

Where the 3-acylate has been used as a starting material for the ketal, it is necessary to hydrolyze this group to the 3-beta-hydroxy-20-ketal, which is then oxidized with cyclohexanone and aluminum isopropoxide, or aluminum tert. butoxide to the corresponding 3-ketone, which after alkaline treatment isomerizes to the 6-alpha-methylprogesterone 20-lower alkylene ketal, by migration of the double bond from the 5,6-position to the 4,5-position, followed by an epimerization of the 6-beta-methyl group to the 6-alpha-position, which is the thermodynamically more stable position. Such sequence of steps, particularly the one involving the epimerization to produce a Δ⁴-ketone with the 6-methyl group in the 6α-position is not unusual as compared to the prior practices in this art. Quite serious complications arise from the presence of the 6-methyl group. First, the reaction time in the Oppenauer type oxidation needs to be prolonged. Second, the isomerization and epimerization is generally carried out with acid. If the 6-methyl group were not present, this could be achieved with an acid wash which also removes the aluminum salt as water solubles. When the 6-methyl group is present, together with acid sensitive groups, such as the ketal moiety, acid treatment would obviously lead to hydrolysis and loss of such important blocking groups. It was found that one half hour heating with aqueous sodium or potassium carbonate after completion of the reaction effectively shifted the double bond from position 5 to 4, and at the same time cleaved the aluminum complex to form an aqueous suspension of aluminum hydroxide, which could be separated and reextracted with toluene. This extract could be steam distilled to remove the cyclohexanone condensation products and solvents, however only in the presence of aqueous alkali metal carbonate solution, which effectively protected the ketal groups from hydrolytic cleavage. The 6-methylprogesterone 20-monoethylene ketal so isolated had an optical rotation at +60° to +64°, indicating a 1:1 mixture of the 6α- and 6β-epimers. It was found that this mixture very efficiently could be epimerized to the desired 6α-epimer by refluxing for 1½ hours in a 5% solution of diethylamine in methanol. Other bases can be used, but diethylamine is most convenient because it boils below methanol, which greatly contributes to facile isolation of the epimerization produced by simple concentration on the steam bath, preferably under reduced pressure. The base is removed with the vapors and the stereochemically pure 6α-methyl progesterone 20-monoketal crystallizes directly from the residual methanol upon cooling. The importance of having a stereochemically pure intermediate is emphasized, as no cumbersome chromatographic separation is necessary in the subsequent step.

This pure thermodynamically more stable 6-alpha epimer of the 6-methylprogesterone 20-lower alkylene ketal is then reduced with lithium aluminum hydride, lithium borohydride, sodium borohydride or a similar metal hydride, or with alkali metal and alcohol to the 20 ketal, the 3 - beta - hydroxy - 6 - alpha - methylpregn - 4 - en - 20- one, 20 - alkylenedioxy or 20 - dialkyldioxy which in itself exhibits the claimed activity, but which also can be further hydrolyzed to give the 3-beta-hydroxy-6-alpha-methylpregn - 4 - en - 20 - one. The 3 - beta - ol can then be converted to the 3-acyloxy ester by reaction with the acid anhydride of the acyl radicals to be introduced. Alternatively, the 3-acyloxy group can be introduced by treatment with the acid anhydride before hydrolyzing of the 20-ethylene ketal group. The 20-lower alkylene ketals do not need to be hydrolyzed but the 3-beta-hydroxy-20-ketal compounds or the beta acyloxy compounds can be used in the form of their 20-lower alkylene ketals, preferably their 20-ethylene ketals. By the procedure described in our Patent No. 3,061,606 that 20-ketal hydrolysis is effected without hydrolysis of the ester group and without inversion of the allylic structure to delta-5-compounds by use of dilute ethanolic-oxalic acid or by refluxing in aqueous methanol or dioxane.

In an alternate new procedure, we have found that the 3 - beta - hydroxy - 6 - alpha - methylpregn - 4 - en - 20- one compound may be prepared from 6-alpha-methyl-17-alpha-acetoxyprogesterone (Upjohn's Provera) as a starting material by applying a Serini-Logemann reaction (after a hydride reduction, followed by acetylation) to convert the 17-alpha and 20-hydroxy groups into a 20-ketone, thus obviating the need for a selective reduction of a 3,20-diketo precursor or the selective oxidation of a 3,20-diol according to the following scheme:

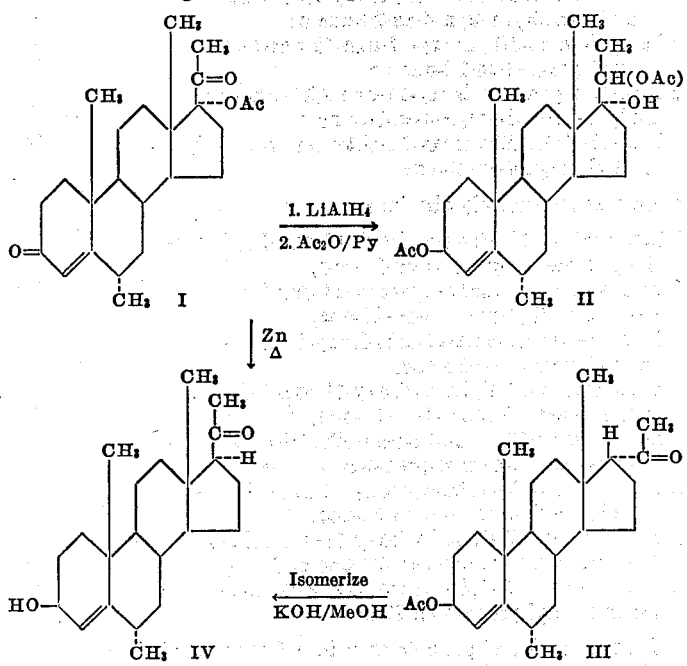

As shown in this scheme, a solution of Provera (I) in tetrahydrofuran may be added dropwise to a solution of lithium aluminum hydride in diethyl ether and stirred overnight at room temperature. The crude intermediate reduction product, the 3,17,20-triol, was acetylated with acetic anhydride and pyridine to give the 3,20-diacetoxy derivative, 3-beta-17-alpha,20-trihydroxy-6-methyl-pregn-4-ene, 3,20-diacetate (20-isomeric mixture) (II). The structure of the compounds (II) is consistent with infrared and ultra-violet spectral data. The mixture can be purified by chromatography, but as intermediate in the present preparation in which both isomers are useful, the crude mixture may be directly subjected to the Serini-Logemann reaction without any separation.

Serini-Logemann reaction

The 3,20-diacetate (II) in the Serini-Logemann reaction was first mixed thoroughly with 20 times excess by weight of zinc dust. This mixture was then placed in a sublimation tube and slowly heated in an oil bath at reduced pressure. The sublimate deposited on the cold finger between 150 and 180° C. at 0.5 to 0.1 mm. Hg pressure. The Serini reaction proceeds by reaction of an acetic acid ester group and by inversion of the groups at $C_{17}$ as shown in the formulation above. The resulting compound 3-beta-acetoxy-6-alpha-methyl-17-isopregn-4-en-20-one (III) has a relatively less stable 17-alpha-sidechain and is readily isomerized to the more stable form in the next step. The attempts to crystallize the Serini product, Formula III, were not successful, even with chromatography. The sublimate (III) was finally subjected to equilibriation by refluxing under nitrogen for two hours in a 5% KOH solution in methanol. The desired reaction product, 3-beta-hydroxy-6-alpha-methylpregn-4-en-20-one (IV) was crystallized from an ether extract in an overall yield of 20%. Oxidation of the compound (IV) with $MnO_2$ gave a $\Delta^4$-3-keto compound found to be identical with an authentic sample of 6-alpha-methylprogesterone.

The following examples illustrate the practice of this invention:

EXAMPLE XII (A) 6-alpha-methylpregn-4-en-3-beta-17-alpha-20-triol 3-beta-20-diacetate (20-isomeric mixture)

A solution of 3.3 grams of 6-alpha-methyl-17-alpha-acetoxy-progesterone (I) in 200 ml. of tetrohydrofuran was added dropwise to a suspension of 3 grams of lithium aluminum hydride in 150 ml. of diethyl ether. The reaction flask in an ice bath was stirred magnetically while the addition was made and then allowed to stand at room temperature overnight. Thereafter, the solution was worked up by adding an excess of ethyl acetate dropwise followed by a saturated sodium sulfate solution until the suspended inorganic salts separated as a cake from the clear supernatent solution. The solvent was removed in vacuo from the filtered organic phase. No high intensity absorption in the ultra-violet showed in the crude crystalline residue nor any absorption in the 6μ region of its infrared spectrum, indicating complete reduction of all carbonyl and ester groups to the respective hydroxyls. This solution of the 3,17,20-triols was acetylated in 30 ml. of pyridine and 6 ml. of acetic anhydride overnight at room temperature. Evaporation in vacuo of the pyridine and the excess acetic anhydride afforded a clear, glassy syrup which could be purified further by chromatography to yield 6-alpha-methylpregn-4-ene-3-beta-17-alpha, 20-alpha- and 20-beta-triol 3,20-diacetate (II).

(B) 3 - beta-acetoxy-6-alpha-methyl-17-isopregn-4-en-20-one (III)—Serini-Logemann reaction A 1.3 g. portion of the crude 3,20-diacetate (II) (limited by capacity of sublimation apparatus) was mixed thoroughly with 22 g. of zinc dust by means of a mortar and pestle. This dry mixture was placed in a sublimation tube which was specially designed with an enlarged base. The sublimation vessel was evacuated with a hi-vac pump and slowly heated in an oil bath. The cold finger showed a deposit of 12 white sublimate at approximately 150° C. oil bath temperature at a pressure of 0.5 to 0.1 mm. Hg (measured with a Hasting's gauge). The temperature was allowed to rise slowly to 180° C. at which point a heavy sublimate was visible and the heating was terminated. The sublimate was scraped off the cold finger and dissolved in diethyl ether and filtered. A portion of the sublimate was insoluble in ether. The infrared spectrum of this insoluble solid was identical with that of zinc acetate which is an expected reaction product of the Serini reaction. The ether soluble fraction yielded 1.01 g. of a colorless syrup which failed to crystallize after repeated attempts.

*Analysis.*—Calc'd for $C_{24}H_{36}O_3$: C, 77.37; H, 9.74. Found: C, 77.51; H, 10.01.

No UV absorption from 230 to 300μ and bands in the I.R. at 135 and 1250 (ester), 1650 (double bond) and 1710 cm.$^{-1}$ (sat. ketone).

(C) 3-beta-hydroxy-6-alpha-methylpregn-4-en-20-one (IV)

The Serini product (III) of Example XII(B) which had the less stable, unnatural 17-alpha-side chain was isomerized by refluxing in a 5% KOH in methanol solution under nitrogen for two hours. The isomerized material was crystallized from diethyl ether to yield the desired allylic 3-hydroxyl compound with the side chain in the normal 17-beta position in about 20% overall yield.

A recrystallized analytical sample had an M.P. 133–137° C.

$[\alpha]_D^{20}$ (MeOH) +109°+3°

*Analysis.*—Calc'd for $C_{22}H_{34}O_2$: C. 79.95; H, 10.37. Found: C, 80.13; H, 10.53.

Oxidation of a sample of the above with manganese dioxide in methylene chloride at room temperature yielded 6-alpha-methylprogesterone as shown by comparison of its melting point and infrared spectrum with an authentic sample.

EXAMPLE XIII 3 beta-acetoxy-6-alpha-methylpregn-4-en-20-one

The 3-hydroxy compound (IV) of Example XII(C) was acetylated by adding 2 grams to a solution of 20 ml. pyridine containing 5 ml. of acetic anhydride. The pyridine and excess acetic anhydried were removed in vacuo and the glassy residue was recrystallized from diethyl ether; 132 to 135° C. M.P.

*Analysis.*—Calc'd for $C_{24}H_{36}O_3$: C, 77.37; H, 9.74. Found: C, 77.03; H, 9.99.

Following the procedure of this example but substituting as esterifying agents for the acetic anhydride of this example, caproic anhydride, phenyl acetic anhydride, benzoic anhydride, formic anhydride, acrylic anhydride, butyric anhydride, dimethyl acetic anhydride, valeric anhydride, heptanoic anhydride, octanoic anhydride, cyclopentanoic anhydride, cyclohexyl formic anhydride, toluoic anhydride, and naphthoic anhydride, there was obtained caproic, phenyl acetic, benzoic, formic, acrylic, propinoic, butyric, dimethyl acetic, valeric, heptanoic, octanoic, cyclopentanoic, cyclohexyl formic, toluic, 3,4-dimethylbenzoic and naphthoic 3-beta esters of compound (IV), respectively.

EXAMPLE XIV (A) 3-beta-hydroxy-6-methylpregn-5-en-20-one 20-ethylene ketal

To a solution of 10 g. of 3-beta-hydroxy-6-methylpregn-5-en-20-one in 300 ml. of 2-methyl-2-ethyl-1,3-dioxolane was added 120 mg. p-toluenesulfonic acid monohydrate, and heated in a 500 ml. flask, equipped with a packed column having a total reflux-partial take-off head, corresponding to approximately 40 theoretical plates when under total reflux. The mixture was heated to boiling and the reflux ratio maintained at about 1:60 for a period of 24 hrs. In the beginning of the period the temperature at the top of the column was 79°, which is the boiling point of butanone, being removed from the reaction mixture and thus displacing the equilibrium in the desired direction. At the end of the reaction period the boiling point at the top of the column was 116°, indicating that the distillate was pure methyl-ethyl-dioxolane and that the reaction was complete.

The solution was cooled, transferred to a separatory funnel, and washed twice with 100 ml. each of 2 N sodium carbonate solution. Finally the dioxolane layer was dried over anhydrous potassium carbonate and concentrated to dryness in vacuo.

The residue was crystallized from methanol containing one drop of diethylamine to give 8.4 of 3-beta-hydroxy-6-methylpregn-5-en-20-one 20-ethylene ketal. The infrared spectrum of this substance did not show any absorption in the 6μ region. A recrystallized sample melted at 157–159° C., with prior softening.

$[\alpha]_D^{22}$ —57° (chloroform)

*Analysis.*—Calc'd for $C_{24}H_{38}O_3$: C, 76.96; H, 10.23. Found: C, 76.80; H, 10.31.

(B) 6-alpha-methylprogesterone 20-ethylene ketal 10 g. of crude 6-alpha-methylpregnenolone ethylene ketal were dissolved in 300 ml. toluene, 70 ml. of cyclohexanone was added and then approximately 50 ml. of solvent mixture was distilled off to remove moisture. During continued slow distillation a solution of aluminum isopropoxide (5 g. in 35 ml. of toluene) was added during a period of about 10 minutes and the mixture allowed to boil for an additional 90 minutes. During this period the heat was regulated such, that 100–120 ml. of solvent mixture distilled off. The contents of the flask were cooled to about 30–40° 100 ml. of 2 N aqueous sodium carbonate solution were added, and the vigorously agitated mixture heated on the steam bath for about 30–40 minutes. During this procedure the aluminum complex was cleaved to form a suspension of aluminum hydroxide which stayed for the most part in the lower aqueous layer, which was separated after transfer to a separatory funnel. The toluene layer was reextracted twice with 100 ml. of 2 N aqueous sodium carbonate. The aqueous layers were combined and reextracted twice with each 150 ml. of toluene. The toluene extracts were combined, 50 ml. of aqeous 2 N sodium carbonate solution added, and the solvents were removed by direct steam injection, which also effectively removed the cyclohexanone condensation products. The steam injection was continued until no more oily material separated in a sample of the distillate, which was the case after approximately 3 hours.

The residual oily material was decanted and taken up in hexane, some impurities from the steam line were filtered off, and the filtrate concentrated to about 90–100 ml. and left overnight in the Deepfreeze to crystallize. The crystalline material was filtered, washed with a little hexane-ether. After drying the material weighed 8.65 g., M.P. about 140–151° C.; $[\alpha]_D^{22}$ +64° (chlf.). The infrared spectrum exhibited bands at 9.5 and 10.5$\mu$, and the characteristic bands of $\alpha,\beta$-unsaturated carbonyl in the 5.95 and 6.12$\mu$ region. It showed absence of hydroxyl and nonconjugated carbonyl bands. On the basis of this evidence, it was concluded that the product isolated was 6-methylprogesterone 20-ethylene ketals (6-epimeric mixture).

Epimerization 8.6 g. of the 6-epimeric mixture obtained was refluxed for 90 minutes in a solution of methanol (250 ml.) and diethylamine (12.5 ml.). The solution was concentrated to a small volume under reduced pressure, and the crystalline material isolated by filtration. Some colored side products stayed in solution in the methanol filtrate. The solids were washed with cold ether and dried. 7.5 g. of material were obtained M.P. 169–174° C.; $[\alpha]_D^{22}$ +79° (chlf.). One recrystallization from ether provided the analytical sample: M.P. 173–174.5° C.; $[\alpha]_D^{22}$ +80° (chlf.). The infrared spectrum showed bands at 9.5 and 10.5$\mu$, and the characteristic bands of $\alpha,\beta$-unsaturated carbonyl in the 5.95 and 6.12$\mu$ region. Hydroxyl and nonconjugated carbonyl bands were absent. On the basis of this evidence it was concluded that the product isolated was the pure 6$\alpha$-methylprogesterone 20-ethylene ketal. The identity was further confirmed by elemental analysis, ultraviolet spectrum (log $\epsilon$, 423 at $\lambda_{max}$, 240$\mu$ (methanol)), as well as subjecting the compound to 17 hours reaction in acetone containing 1% p-toluenesulfonic acid monohydrate, which gave 6$\alpha$-methylprogesterone, M.P., 12–123° C.; $[\alpha]_D^{22}$ +178° (chlf.), and no depression in melting point was observed upon admixture with an authentic specimen.

(C) 3-beta-hydroxy-6-alpha-methylpregn-4-en-20-one 20-ethylene ketal 2 grams of 6-alpha-methylprogesterone 20-ethylene ketal (XIV(B)) were dissolved in 40 cc. of ethanol, and 1 gram of sodium borohydride was added in small portions with magnetic stirring. After allowing to stand overnight, water was added, the ethanol was evaporated off in vacuo and the mixture was filtered and recrystallized from ethanol resulting in 1.2 grams of colorless prisms melting at about 160–165° C. Infrared analysis indicated the presence of hydroxyl and the absence of ketone and ketal bands in the 9.5 and 10.5$\mu$ region. Further crystallization from ethanol containing diethylamine gave prismatic crystals identified as 3-beta-hydroxy - 6 - alpha-methylpregn-4-en-20-one - 20 - ethylene ketal: Melting point 171–172° C.; $[\alpha]_D^{22}$ +36.5° (chlf.).

Analysis.—Calculated for $C_{24}H_{38}O_3$: Carbon, 76.96%; hydrogen, 10.23%. Found: Carbon, 76.90%; hydrogen, 10.29%.

(D) 3-beta-hydroxy-6-alpha-methylpregn-4-en-20-one (IV)

Three hundred mg. of crude 3-beta-hydroxy-6-alpha-methylpregn-4-en-20-one 20-ethylene ketal (III(C)) were dissolved in 20 cc. of 0.08% ethanolic oxalic acid solution and allowed to stand for 16 hours at 25° C. Alternatively, the ketal could be hydrolyzed by refluxing it overnight in either aqueous dioxane or methanol. Then the mixture was neutralized with concentrated aqueous ammonia solution, the ethanol was evaporated in vacuo and the resulting crystallisate was filtered off. After chromatography on aluminum oxide and recrystallization, 215 mg. of colorless prisms, identical with the product of (IV), Example XII(C) was obtained.

EXAMPLE XV 3-beta-5-alpha-dihydroxy - 6 - beta-methylpregnan-20-one (10 g.) was added to 25 ml. of pyridine and 8 ml. of acetic anhydride and stirred (magnetic stirrer) overnight at 45° C. 5 ml. water was added slowly under sufficient cooling to keep the temperature at 40 to 45° C. for 45 minutes. The desired 3-acetate was then precipitated by pouring the mixture into one liter of ice water. The resulting crystals were collected by filtration, washed well with distilled water and dried at 105°. There was obtained 10.5 g. of 3-monoacetate, which was dissolved in 200 ml. 2-methyl-2-ethyl-1,3-dioxolane, 400 mg. para-toluene-sulfonic acid monohydrate added and distilled slowly for 5 hours through a packed column. By this time the temperature of the mixture on top of the column was found to be the boiling point of the dioxolane (117°), indicating that the reaction was complete. Further evidence was obtained by refractometric analysis of the distillation, which showed that a ratio of 2 moles of butanone had been removed during the reaction period. It is a known fact that ketalization of a carbonyl group by interchange with 2-methyl-2-ethyl-1,3-dioxolane produces a one mol ratio of butanone. Elimination of water from the 3-alpha-18-hydroxy gives rise to an additional mol of butanone.

The resulting mixture containing 6-methylpregnenolone acetate was worked up by washing it twice with 10% potassium carbonate solution, then with water. Drying over sodium sulfate and concentration to dryness in a water bath under reduced pressure gave an oily residue, the I.R. spectrum of which agreed with the structure of 3-beta-acetoxy-6-methylpregn-5-en-20-one 20-ethylene ketal. The oily residue was heated for 30 minutes with 250 ml. of methanol containing 2.5 g. of potassium hydroxide. Addition of 1 ml. of acetic acid and concentration to a small volume gave a crystalline precipitate, which was filtered, washed with water and a little methanol to give 8 g. of 6-methylpregnenolone 20-ethylene ketal in all respects identical with the substance described in Example XIV(C).

EXAMPLE XVI 3-beta-acetoxy-6-alpha-methylpregn-4-en-20-one 20-ethylene ketal

The procedure of Example XIII was repeated but substituting 3 - beta-hydroxy-6-alpha-methylpregn-4-en-20-one 20-ethylene ketal of Example XIV(C) instead of compound (IV), and the acetylation product obtained was the corresponding 20-ethylketal-3-acetate of compound (IV). Other 3-acyl esters of the 20-ketal can be formed by the same procedure.

The effectiveness of applicants' compounds is illustrated by the tests described in Tables I–VI hereinbelow. The anti-ovulatory activity of 6-alpha-methyl-3-beta-hydroxy-pregn-4-en-20-one (compound (IV), column 12, lines 21–47, prepared in Examples XI and XIV(D)) was tested in female rabbits in a group of tests presented in Table V following the method reported by Pincus and Chang, M.C. Acta, Physiol., Latino Americano 3; 117, 1953; and Pincus, Proc. Fifth International Conference on Planned Parenthood, 1955, p. 176.

The compound was found to be active by both the subcutaneous and oral routes. Complete suppression of ovulation was obtained by the subcutaneous use of 2 mg. and significant reductions were found with doses of as little as 0.016 mg. The compound also produced significant ovulation inhibition when administered orally at a dose of 0.016 mg.

Both the 20-ethylene ketal and the 3-beta-acetoxy 20-ethylene ketal of 6-alpha-methyl-pregn-4-en-20-one were active in the antiovulation assay of Pincus and Chang (1953) at subcutaneous dose levels of 0.03 mg. and oral dose levels of 0.05 mg. Complete ovulation suppression was obtained at the 2 mg. dose levels by both routes.

(I) ORAL PROGESTATIONAL ASSAL OF McPHAIL (McPhail, M. K., J. Physiol. 83: 145, 1934)

Immature female rabbits, weighing 750–950 gm. were primed with estradiol benzoate subcutaneously over a six day period. After this priming period, the test compound was administered orally once daily for five days. The uterine proliferation was graded on a scale from zero (no stimulation) to 4+ (maximum progestational effect).

TABLE I.—THE ORAL PROGESTATIONAL ACTIVITY OF 6α-METHYL-3β, 17α DIACTOXYPREGN-4-EN-20-ONE IN THE RABBIT

| Compound | Total dose, mg. | No. of rabbits | Response [1] (range) |
|---|---|---|---|
| 17α-Ethynyl-19-nortestosterone (Standard) [2] | 0.63 | 9 | 1.3 (0.5–2.0) |
|  | 1.25 | 14 | 2.9 (1.5–4.0) |
|  | 2.5 | 3 | 3.5 (3.0–4.0) |
|  | 5.0 | 5 | 3.8 (3.5–4.0) |
| 6α-Methyl-3β,17α-diacetoxypregn-4-en-20-one | 0.02 | 3 | 0 |
|  | 0.04 | 3 | 0.3 (0–1) |
|  | 0.08 | 3 | 2 (0.5–3.0) |
|  | 0.15 | 4 | 3.3 (3.0–3.5) |
|  | 0.3 | 2 | 3.5 (3.5–3.5) |
|  | 0.6 | 2 | 4 |
|  | 1.2 | 2 | 4 |

[1] Response scale from 0 to 4+
[2] Data published by F. A. Kincl, Endokrinologie 40, 257–266, 1961

(II) ANTI-ESTROGEN METHOD (Dorfman, R. I. and Kincl, F. A., Steroids 1: 185, 1963)

Twenty to twenty-two day old Swiss albino mice were injected subcutaneously once daily with estrone for three days. The total dose of 0.4 μg. was contained in 0.3 ml. of sesame oil and 0.1 ml. was injected daily. Control groups of mice received only sesame oil. The test substance was injected subcutaneously or administered by gavage once daily for 3 days in 0.2 ml. per day of an aqueous suspending vehicle at a site different from that used for estrone injections. Separate sites were used for the injection of the estrogen and the test compound to prevent the possibility that a lowered estrogenic effect might be due to a decreased rate of estrogen absorption from the injection site. The aqueous suspending medium consisted of sodium chloride (0.9%), polysorbate 80 (0.4%), carboxymethylcellulose (0.5%3, and benzyl alcohol (0.9%). One day after the last injection, the animals were sacrificed and uterine weights and body weights determined.

TABLE II.—THE ANTI-ESTROGENIC ACTIVITY OF 6α-METHYL-3β, 17α DIACETOXYPREGN-4-EN-20-ONE IN A MOUSE TEST BY GAVAGE

| Route | Steroid | Total no. of mice | Dose range studied, μg. | Minimum dose to produce inhibition, μg |
|---|---|---|---|---|
| Gavage | 6α-Methyl-17α-acetoxy-pregn-4-ene-3,20-dione | 55 | 50–1,000 | 500 |
| Do | 6α-Methyl-3β,17α-diacetoxy-pregn-4-en-20-one | 20 | 50–150 | 150 |

(III) ANTI-ANDROGEN METHOD (Dorfman, R. I., Proc. Soc. Exptl. Biol. and Med., 111: 44, 1962; Steroids 2: 185, 1963)

Swiss albino mice were castrated at 21 to 23 days of age. On the day of operation and once daily for a total of seven consecutive days, testosterone or methyltestosterone (17α-methyl-17β-hydroxy-androst-4-en-3-one) dissolved in 0.1 ml. of sesame oil was injected subcutaneously. The total dose of androgen was 0.8 mg. The test material in an aqueous suspending medium was injected once daily for 7 days, also, starting on the day of operation. This medium consists of sodium chloride (0.9%), polysorbate 80 (0.4%), carboxy-methyl cellulose (0.5%), and benzyl alcohol (0.9%). Twenty-four hours after the last injections the body, prostate, and seminal vesicle weights were determined. The results were expressed as tissue ratios defined as milligrams of tissue per gram of body weight.

TABLE III.—THE MOUSE ANTIANDROHENIC ACTIVITY OF 6α-METHYL-3β,17-αDIHYDROXYPREGN-4-EN-20-ONE-17-ACETATE (I) COMPARED TO 6α-METHYL-17α-HYDROXY-PREGN-4-ENE-3,20-DIONE-17-ACETATE (II)

| Test compound designation: | Total dose, mg. | Total dose of testosterone, mg. | No. of mice | Seminal vesicles Ratio±S.E. |
|---|---|---|---|---|
| 0 | 0 | 0 | 9 | 0.15±0.02 |
| 0 | 0 | 0.8 | 9 | 0.86±0.04 |
| II | 5 | 0.8 | 9 | 0.94±0.05 |
|  | 15 | 0.8 | 8 | 0.86±0.06 |
| I | 5 | 0.8 | 4 | 1.08±0.19 |
|  | 15 | 0.8 | 7 | 0.65±0.09 |

Table III illustrates the increase in antiandrogenic activity for the delta-4-3β-ol steroid (compound II) as compared to the corresponding delta-4-3-ketone (compound I). No significant antiandrogenic effect could be elicited from 5 and 15 mg. total doses of II, but the 15 mg. dose of I showed a significant lowering of the seminal vesicle ratio from 0.86±0.04 (S.E.) to 0.65±0.09.

TABLE IV.—THE MOUSE ANTIANDROGENIC ACTIVITY OF 6α-METHYL DIHYDROXYPREGN-4-EN-20-ONE-3β,17α-DIACETATE (I) COMPARED TO 6α-METHYL-17α-HYDROXYPREGN-4-ENE-3,20-DIONE-17α-DIACETATE (II)

| Test compound designation: | Total dose, mg. | Total dose of testosterone, mg. | No. of mice | Seminal vesicles Ratio±S.E. |
|---|---|---|---|---|
| 0 | 0 | 0 | 9 | 0.15±0.02 |
| 0 | 0 | 0.8 | 9 | 0.86±0.04 |
| II | 5 | 0.8 | 9 | 0.94±0.05 |
|  | 15 | 0.8 | 8 | 0.86±0.06 |
| I | 5 | 0.8 | 8 | 0.81±0.13 |
|  | 15 | 0.8 | 9 | 0.66±0.07 |

Table IV illustrates the increase in antiandrogenic activity for the delta-4-3β-ol steroid (compound II) as compared to the corresponding delta-4-3-ketone (compound I). No significant antiandrogenic effect could be elicited from 5 and 15 mg. total doses of II, but the 15 mg. dose of I showed a significant lowering of the seminal vesicle ratio from 0.86±0.04 (S.E.) to 0.66±0.07.

TABLE V.—ANTI-OVULATORY ACTIVITY OF 6-ALPHA METHYL 3-BETA-HYDROXY PREGN-4-EN-20-ONE

Conditions:
1. Administration of test compound at 0 hour to a postpartum female rabbit.
2. At 18–24 hours treated female rabbit is mated with a rabbit of known fertility.
3. One day after mating ovaries are inspected for rupture points at laporatomy.

| Route of Administration | Total dose of compound, mg. | No. of female rabbits | Rabbits showing ovulation points, percent |
|---|---|---|---|
| Subcutaneous injection | 0.0032 | 5 | 60 |
|  | 0.0064 | 4 | 50 |
|  | 0.016 | 5 | 20 |
|  | 0.08 | 5 | 20 |
|  | 0.4 | 5 | 20 |
|  | 2.0 | 5 | 0 |
|  | 10.0 | 5 | 0 |
| Oral | 0.0032 | 5 | 100 |
|  | 0.016 | 5 | 40 |
|  | 0.08 | 5 | 40 |
|  | 0.4 | 5 | 40 |
|  | 2.0 | 5 | 20 |

Table VI compares the progestational activity of compound IV with progesterone in a progestational assay based on the carbonic anhydrase content of estrogen primed uterus by the method defined by Pincus et al. (Endocrinology 61: 528, 1957). The results indicate that the 6-alpha methyl steroid administered subcutaneously is some three times as active as progesterone as a progestational agent. The steroid also showed significant oral activity at the 0.4 mg. dose.

TABLE VI.—THE PROGESTATIONAL ACTIVITY OF 6-ALPHA-METHYL-3-BETA-HYDROXYPREGIN-4-EN-20-ONE (6aM)

| Material administered | Total dose, mg. (route) | No. of rabbits | Carbon anhydrase concentration uterus E. U. per gram/S. E. | |
|---|---|---|---|---|
| 0 | 0 | 10 | 67 | 6.5 |
| Progesterone | 0.5 | 4 | 359 | 37 |
|  | 1.0 | 6 | 594 | 60 |
| 6a-M | 0.1 (Sub. inj.) | 4 | 203 | 57 |
|  | 0.4 (Sub. inj.) | 4 | 516 | 20 |
|  | 0.1 (Oral) | 4 | 114 | 36 |
|  | 0.4 | 4 | 103 | 6 |

The corresponding acyl esters of compound IV were found to have only a slightly greater activity than progesterone. However, the progestational activity was prolonged for a substantially longer period as shown in our copending parent application, Ser. No. 721,371.

The compounds in useful dosage levels from about 0.016 mg. to about 3 mg. per kg. body weight can be made up as pills for use orally; or as a liquid or jelly for injection subcutaneously by distributing the compounds in a liquid or gelatinous solid therapeutically acceptable carrier. It can be dissolved in an edible fixed oil such as peanut oil, cotton seed oil, corn oil or the like; in a solid gelatinous or waxy carrier such as lard, hydrogenated fixed oils, stearin cocao butter, aluminum stearate or other usually fatty carriers for injectibles; or it can be formed into pills with such solid carriers as starch, sugar, bentonite, silica gel, alumina and other common carriers for orally administered medicaments and will be distributed therein homogeneously in quantity convenient to supply a dosage in the range stated, of about 0.016 to 3.0 mg. per kg. body weight, usually distributed in a concentration in a carrier sufficient to apply the dosage in a 0.1 to 2 cc. for injection; or 1 to 2 tablets taken orally where the carrier is a dry carrier for oral administration.

We claim:
1. A compound having the formula

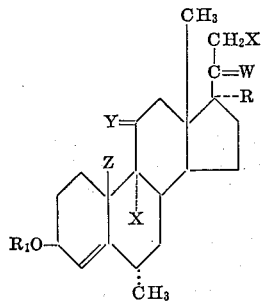

wherein R is a member selected from the group consisting of hydroxy and acyloxy; $R_1$ is a member selected from the group consisting of hydrogen and acyl, the acyl group of both R and $R_1$ being a carboxylic acid acyl having from 1 to 10 carbon atoms; X is a member selected from the group consisting of hydrogen, chlorine and fluorine, Y is a member selected from the group consisting of =O, and

W is a member selected from the group consisting of oxygen and lower alkylene ketal; and Z is a member selected from the group consisting of hydrogen and methyl.

2. A compound having the formula

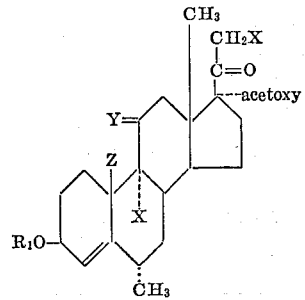

wherein $R_1$ is acyl, the acyl group of $R_1$ being a carboxylic acid acyl having from 1 to 10 carbon atoms; X is a member selected from the group consisting of hydrogen, chlorine and fluorine; Y is a member selected from the group consisting of =O, and

and Z is a member selected from the group consisting of hydrogen and methyl.

3. 3-beta-17-alpha,20-trihydroxy-6-alpha-methyl-pregn-4-ene 3,20-diacetate.

4. 3 - beta-acetoxy-6-alpha-methyl-17-isopregn-4-en-20-one.

References Cited

UNITED STATES PATENTS 3,126,399   3/1964   Sollman _____ 260—397.4

OTHER REFERENCES

Chemical Abstracts, 52, cols. 5445 and 46 (1958).

HENRY A. FRENCH, Primary Examiner

U.S. Cl. X.R.

260—397.4, 397.45, 397.47, 397.5, 999